United States Patent
Jáuregui Misas et al.

(10) Patent No.: US 12,032,201 B2
(45) Date of Patent: Jul. 9, 2024

(54) OPTICAL WAVEGUIDE

(71) Applicants: Fraunhofer-Gesellschaft zur Förderung der angewandten Forschung e.V., Munich (DE); Friedrich-Schiller-Universität Jena, Jena (DE)

(72) Inventors: César Jáuregui Misas, Jena (DE); Jens Limpert, Jena (DE); Andreas Tünnermann, Weimar (DE)

(73) Assignees: Fraunhofer-Gesellschaft zur Förderung der angewandten Forschung e.V., Munich (DE); Friedrich-Schiller-Universität Jena, Jena (DE)

( * ) Notice: Subject to any disclaimer, the term of this patent is extended or adjusted under 35 U.S.C. 154(b) by 0 days.

(21) Appl. No.: 17/616,720

(22) PCT Filed: Jun. 4, 2020

(86) PCT No.: PCT/EP2020/065422
§ 371 (c)(1),
(2) Date: Dec. 6, 2021

(87) PCT Pub. No.: WO2020/245244
PCT Pub. Date: Dec. 10, 2020

(65) Prior Publication Data
US 2022/0326431 A1     Oct. 13, 2022

(30) Foreign Application Priority Data
Jun. 4, 2019    (DE) ..................... 10 2019 114 974.6

(51) Int. Cl.
*G02B 6/02* (2006.01)

(52) U.S. Cl.
CPC ......... *G02B 6/02042* (2013.01); *G02B 6/021* (2013.01)

(58) Field of Classification Search
CPC .. G02B 6/02042; G02B 6/021; G02B 6/2821; G02B 6/29331; G02B 6/4296;
(Continued)

(56) References Cited

U.S. PATENT DOCUMENTS 6,496,303 B1   12/2002  Fleming
7,242,827 B1    7/2007  Bochove
(Continued)

FOREIGN PATENT DOCUMENTS

DE          69903269       7/2003
DE       102014001252      8/2015
(Continued)

OTHER PUBLICATIONS

International Search Report and the Written Opinion dated Sep. 15, 2020 From the International Searching Authority Re. Application No. PCT/EP2020/065422 and Its Translation of Search Report Into English. (14 Pages).
(Continued)

*Primary Examiner* — Tina M Wong

(57) ABSTRACT

The invention relates to an optical waveguide with two or more light-guiding cores (1a-1e) extending continuously along the longitudinal extension of the optical waveguide, parallel to one another and spaced apart from one another, from one end of the optical waveguide to the other, and with a first cladding (2) enclosing the cores (1a-1e). It is an object of the invention to provide a multicore optical waveguide for high-power operation with reduced system complexity compared to the prior art. This object is achieved by the invention in that the cores (1a-1e) are arranged relative to one another and are spaced apart from one another in such
(Continued)

a)

b)

a way that the propagation modes of the light propagating in the optical waveguide at a working wavelength couple to one another, the length of the optical waveguide being selected such that the light coupled into only a single one of the cores (1a-1e) at one end of the optical waveguide first spreads to the other cores (1a-1e) during propagation through the optical waveguide and, after passing through the optical waveguide, leaves the optical waveguide again at the other end from a single core (1a) with at least 60%, preferably at least 75%, of the total light power propagating in the optical waveguide. The invention also relates to a laser system with such an optical waveguide as an optical amplifier, and a method for guiding light in an optical waveguide.

13 Claims, 3 Drawing Sheets

(58) Field of Classification Search
CPC ............. H01S 3/06737; H01S 3/06754; H01S 3/06733; H01S 3/094007; H01S 3/09415
See application file for complete search history.

(56) References Cited

U.S. PATENT DOCUMENTS

| 7,876,495 | B1 * | 1/2011 | Minelly | G02B 6/02371 |
| | | | | 359/341.1 |
| 10,042,114 | B2 * | 8/2018 | Takenaga | G02B 6/02366 |
| 11,156,781 | B2 * | 10/2021 | Kopp | G02B 6/262 |
| 2014/0036351 | A1 | 2/2014 | Fini et al. | |
| 2018/0259707 | A1 | 9/2018 | Zalevsky et al. | |
| 2020/0400877 | A1 * | 12/2020 | Zhang | G02B 6/02042 |

FOREIGN PATENT DOCUMENTS

| EP | 0441211 | 8/1991 |
| JP | 62-127807 | 6/1987 |
| JP | 63-042190 | 2/1988 |

OTHER PUBLICATIONS

Shalaby et al. "Quasi-Gaussian Beam From a Multicore Fibre Laser by Phase Locking of Supermodes", Applied Physics B: Lasers and Optics, XP019758829, 97(3): 599-605, Published Online May 20, 2009.

* cited by examiner a)

b)

a)

b)

c)

d)

e)

OPTICAL WAVEGUIDE

RELATED APPLICATIONS

This application is a National Phase of PCT Patent Application No. PCT/EP2020/065422 having International filing date of Jun. 4, 2020, which claims the benefit of priority of German Patent Application No. 10 2019 114 974.6 filed on Jun. 4, 2019. The contents of the above applications are all incorporated by reference as if fully set forth herein in their entirety.

FIELD AND BACKGROUND OF THE INVENTION

The invention relates to an optical waveguide with two or more light-guiding cores extending continuously along the longitudinal extension of the optical waveguide, parallel to one another and spaced apart from one another, from one end of the optical waveguide to the other, and with a first cladding enclosing the cores. The invention also relates to a laser system with a laser light source and an optical amplifier coupled thereto. The method further relates to a method for guiding light in an optical waveguide.

Optical waveguides (often in the form of optical fibers made of quartz glass or plastics) are known from the prior art in various embodiments. Optical waveguides are lines for transmitting light. The known optical waveguides are dielectric waveguides, which are made up of concentric layers. In the center is a light-guiding core, which is enclosed by a cladding that has a lower refractive index than the core. In commercial optical waveguides, protective layers made of plastics surrounding the cladding are also provided. Depending on the application, the core has a diameter from a few micrometers to over a millimeter. Optical waveguides are differentiated inter alia according to the number of modes of the electromagnetic radiation of the light that are capable of propagation, which is limited by the core diameter (single-mode/multi-mode fibers).

Recent developments in fiber lasers have led to optical waveguides providing a reliable concept as the active medium in high-power lasers. The development of low-energy lasers into high-power lasers for industrial applications is based on the ability of optical waveguides to handle high power. The very good ratio of surface area to active volume allows heat to be dissipated efficiently. This is an excellent basis for high-power operation. However, conditions in the optical waveguide lead to various problems. For example, restricting the light signal to the core of the optical waveguide leads to high light intensity and interactions between the material of the optical waveguide and the light signal. This also gives rise in particular to nonlinear effects that are difficult to control. The signal quality is therefore severely impaired.

Optical waveguides should accordingly be designed in such a way that nonlinear effects and interactions with the fiber material are reduced. The simplest and most effective way to reduce nonlinear effects is by increasing the diameter of the core. On the one hand this reduces the intensity of the light in the core, and on the other hand, for example in double-clad optical waveguides, the absorption of pump light can be increased. Because of the improved absorption of the pump light, the optical waveguide can be made shorter and thus nonlinear effects can be further reduced.

It has, however, been shown that these measures for optimizing optical waveguides for high-power operation cannot prevent the occurrence of mode instability at high powers. Here, the output signal of the optical waveguide or of a fiber laser made thereof becomes unstable as soon as a certain power threshold is exceeded. Energy is transferred from a fundamental mode to higher-order modes. The beam profile of the radiation propagating in the optical waveguide, which is originally, for example, stably Gaussian, starts to change and the beam profile fluctuates over time as a result of temporally variable superposition of the fundamental mode with one or more higher-order modes. The time response of these fluctuations can be deterministic or, depending on the power of the propagating radiation, can also be random or chaotic. It is known that mode instability is based on spatial temperature variations inside the optical waveguide due to mode interference. This causes spatially and temporally variable absorption of radiation in the material of the optical waveguide. Owing to thermo-optical effects, this has a direct impact on light guidance. The spatial temperature profile of the optical waveguide obtained because of the mode interference results in a lattice structure of the refractive index profile, which promotes an energy transfer between the various modes of the propagating radiation.

To overcome the existing limitations and to increase the light power that can be achieved, e.g. in laser systems for materials processing, it is known from the prior art (see e.g. DE 10 2014 001 252 A1) to use spatially separated optical amplifiers, spectral broadening elements or even just transport channels, wherein a splitting of an input beam into a plurality of sub-beams takes place by means of beam splitters. The sub-beams are amplified, spectrally broadened or transported in a plurality of spatially separated, independent optical elements/channels and finally combined again in an output beam. A distinction must be made here between combining signals with identical spectra and combining signals with different spectra. In the case of spectrally identical combination, the identical spectral components propagate in the different channels; only a splitting of the power occurs at the beam splitter. In the case of spectral combination, however, there is an additional spectral splitting of the input signal. Combinations of the two methods are possible.

In the radiation splitting and recombining method described above, the independent channels can be formed by the various cores of a multicore fiber, each guiding a sub-beam, in which multicore fiber the cores are surrounded by a common cladding (into which the pump light can be coupled for optical amplification). It is known that, in a multicore fiber of this type, the threshold beyond which mode instability and nonlinear effects occur scales approximately with the number of cores. The splitting of the radiation over the individual cores and the recombining of the radiation after it has passed through the multicore fiber take place outside the multicore fiber here by means of suitable optical components (beam splitters).

In the recombination of the sub-beams, the temporal phase position of the individual beams is of fundamental importance and must coincide in the sub-wavelength range. A deviation leads to a reduction in combination efficiency. To achieve this, active stabilizing of the phase positions is necessary. For this purpose, phase-matching elements assigned to the individual channels are generally provided upstream or downstream of the multicore fiber in the beam direction, which affect the phase of the radiation in the relevant sub-beam. These allow the different phase shifts occurring in the individual channels to be cancelled out in order to allow in-phase superposition of the sub-beams in the output beam. To this end, a control loop is used in which the phases of the radiation in the sub-beams are the manipulated variable. Properties of the output beam (e.g. average power, pulse peak power), which are detected by suitable means, are the controlled variable. In this way, phase shifts in the individual channels can be cancelled out automatically.

The previously known approach of beam splitting and recombining in multicore waveguides is very complex and therefore expensive in practice. The reason for this is the complexity of the system with external optical components, i.e. components that are arranged separately from the fiber, for splitting the radiation over the individual cores and recombining the radiation after it has passed through the multicore fiber, as well as the necessary sensors, controllers and adjusting elements for the necessary phase matching control system and stabilization.

SUMMARY OF THE INVENTION

Against this background, it is an object of the invention to provide a multicore optical waveguide for high-power operation, having reduced system complexity compared to the prior art.

This object is achieved by the invention, starting from an optical waveguide of the type mentioned above, in that the cores are arranged relative to one another and spaced apart from one another in such a way that the propagation modes of the light propagating in the optical waveguide at a working wavelength couple to one another, the length of the optical waveguide being selected such that the light coupled into a single one of the cores at one end of the optical waveguide first spreads to the other cores while propagating through the optical waveguide and, after passing through the optical waveguide, leaves the optical waveguide again at the other end from a single core with at least 60%, preferably at least 75%, of the total light power propagating in the optical waveguide.

The invention deviates from the cited prior art, in which carefully mutually shielded cores of the multicore fiber guide the sub-beams. In the optical waveguide of the invention designed for high-power applications, the cores are arranged and spaced apart such that they interact with one another, i.e. they are coupled. The targeted coupling between the cores of the optical waveguide allows the light, which is initially coupled into only a single one of the cores, to spread to the other cores. This corresponds to beam splitting in conventional systems. The light then returns to a single core, e.g. to the original core into which the light was coupled. This corresponds to recombining in conventional systems. At one end of the optical waveguide, therefore, the light is coupled into the one core and then spreads into the other cores over a particular propagation path as a result of the mutual coupling of the propagation modes, to return to a single core, e.g. the original core, after a further propagation path. In this way, the intensity pattern generated by the light over the cross-section of the optical waveguide changes periodically as it spreads along said optical waveguide and, as a function of the propagation path, involves first one core, then a plurality of cores, and then one core again. This cycle can be repeated multiple times along the optical waveguide. The main feature of the invention is that the light is coupled into a single core at the input of the optical waveguide, and the majority of the light power (at least 60%) leaves the optical waveguide again from a single core at the output.

The reason for the automatic recombining of the light after a specific propagation path in a core, in particular the original core, is the Talbot effect. This effect ensures that the periodic structure in which the cores passing continuously through the entire light guide are arranged at the input end of the optical waveguide is imaged, with the light intensity distribution obtained there, in cross-sectional planes of the optical waveguide located at specific periodic intervals along the optical waveguide. The periodicity of this image along the optical waveguide depends on the distances of the cores away from one another, i.e. on the period length of the input-side structure, and on the refractive indices of the cores. For this reason, the length of the optical waveguide can be selected in a targeted manner according to the arrangement and spacing of the cores and the refractive index conditions such that, at the output of the optical waveguide, the light is coupled back again (almost) completely into a single core, preferably the same core into which the light was originally coupled at the input of the optical waveguide.

According to the invention, the splitting of the light radiation into sub-beams by the coupling of the propagation modes takes place automatically, as does the recombining. In contrast to the prior art, therefore, no separate components are needed for beam splitting and beam combining. It is also possible to dispense with a control system with phase setting for stabilizing the recombining. Thus, a laser system in which the optical waveguide according to the invention is employed is significantly less complex and less error-prone compared to the prior art.

At the same time, when the optical waveguide according to the invention is used, the whole of the light power is distributed over a plurality of cores, so that nonlinear effects are avoided and, because the thermal load is distributed over a plurality of cores, the power threshold beyond which mode instability occurs is raised. Thus, the optical waveguide is highly suitable for high-power applications, such as e.g. in laser-assisted materials processing. The optical waveguide according to the invention behaves like a single-core optical waveguide with a larger core diameter, and can be handled as such in application. With e.g. five cores, an effective core diameter can be achieved which is two to three times as large as the core diameter of a corresponding single-core optical waveguide.

The periodicity of the Talbot effect depends on the wavelength of the light. For this reason, the optical waveguide should be designed for a specific working wavelength as regards its length and the arrangement and refractive index profiles of the cores. Within the meaning of the invention, "working wavelength" means an average wavelength value rather than a single wavelength value. Around this value, the principle of the optical waveguide according to the invention works with an adequate spectral bandwidth for most applications. The requirement that more than 60%, or even more than 75%, of the power leaves the optical waveguide from the one core is met for a broad wavelength spectrum.

The optical waveguide according to the invention expediently has a lower refractive index in the region forming the first cladding than in the regions forming the cores. This corresponds to the conventional design of optical waveguides. The differences in refractive index ensure that the light is guided in the various core regions. It has proved advantageous here if the cores have (slightly) different refractive indices from one another. A particularly advantageous embodiment is one in which a central core, which is responsible for coupling the light in and out, has a different refractive index from the other cores that surround this central core, into which the light spreads as a result of the coupling.

In principle, the optical waveguide according to the invention can be formed as a step index fiber. However, a different implementation, e.g. as a photonic crystal fiber, is also possible.

In a preferred embodiment, the refractive index (i.e. the refractive index profile, as viewed in the cross-section of the optical waveguide) in the regions forming the cores varies along the longitudinal extension of the optical waveguide, specifically as a function of the propagation distance, preferably with a different profile for each core. For example, the refractive index of the one core into which the light is coupled into the optical waveguide can initially be raised (or lowered) (continuously) with an increasing propagation distance, while the refractive index remains constant in the other cores. This makes it possible for the mutual coupling of the cores to be suspended over long propagation distances after the light coupled into the one core has spread to the other cores, so that the light cannot get back into the one core again over the course of the optical waveguide. Only towards the end of the waveguide does the one core acquire its original refractive index value again, so that the light is coupled back into this core and finally leaves the optical waveguide again from this core.

For the use of the optical waveguide according to the invention as an optical amplifier, for example in a MOPA laser system ("master oscillator power amplifier"), in a preferred embodiment the optical waveguide can have a second cladding which encloses the first cladding, as viewed in the cross-section of the optical waveguide, the optical waveguide having a lower refractive index in the region forming the second cladding than in the region of the first cladding. In this embodiment, a pump light source can be optically coupled to the first cladding shared by all the cores of the optical waveguide. The pump light is then guided in the first cladding. The optical amplification in the optical waveguide can take place e.g. by nonlinear effects (e.g. stimulated Raman scattering) in the core regions or by stimulated emission, for which purpose the cores are expediently doped with rare earth ions. The radiation emitted by a laser light source is coupled into the one core at one end of the optical waveguide according to the invention, passes through the optically pumped optical waveguide, the intensity distribution being distributed over the other cores in a periodically varying manner, as described above, so that all the cores participate in the guiding and amplification of the laser radiation, i.e., in other words, the laser radiation is distributed over all the cores during the amplification operation. At the other end of the optical waveguide, the amplified radiation is coupled out of the one core again with at least 60% of the total power generated in the optical waveguide, utilizing the Talbot effect.

In a preferred embodiment, at least one of the cores of the optical waveguide is doped with rare earth ions. In a possible embodiment, all the cores are doped. Particularly preferred, however, is an embodiment in which at least one of the cores is not doped with rare earth ions, i.e. is passive. Preferably, all the cores except the one into which the light is coupled and from which the light leaves the optical waveguide again are doped with rare earth ions. The amplification accordingly takes place only in the other cores, into which the light spreads after being coupled into the one core. The passive core, which is e.g. arranged centrally, as viewed in the cross-section of the optical waveguide, and surrounded by the other (active) cores, serves only for coupling the light in and out and does not take part in the amplification.

The optical waveguide according to the invention is suitable not only as an optical amplifier, however, but also, without optical pumping, as a simple transport fiber or as a spectral broadening fiber in which nonlinear effects (e.g. self-phase modulation) in the cores are, to a certain extent, allowed and even desirable.

In a further preferred embodiment, a central core, which is arranged centrally as viewed in the cross-section of the optical waveguide, is provided, which expediently serves for coupling light in and out. The central core is surrounded by at least four further cores in a cross-shaped arrangement. Thus, an arrangement of the cores is obtained which is periodic in cross-section, this being advantageous for utilizing the Talbot effect. An alternative periodic arrangement is obtained if the central core is surrounded by the further cores in one or more concentric, circular arrangements.

Embodiments in which the cores have identical or different diameters and/or refractive index profiles are possible.

An embodiment with a circular cross-section is expedient for producing the optical waveguide, e.g. as an optical fiber. In principle, apart from the arrangement and spacing of the cores, the optical fiber can be designed like a conventional multicore fiber with regard to the working wavelength.

The invention also provides a method for guiding light in an optical waveguide having two or more light-guiding cores extending along the longitudinal extension of the optical waveguide, parallel to one another and spaced apart from one another, and a first cladding enclosing the cores. According to the invention, the light is coupled into only one of the cores at one end of the optical waveguide, the cores being arranged relative to one another and spaced apart from one another in such a way that the propagation modes of the light propagating in the optical waveguide at a working wavelength couple to one another and the light spreads from the one core into the other cores, the length of the optical waveguide being selected such that, utilizing the Talbot effect, after the light has passed through the optical waveguide it leaves the optical waveguide again at the other end from only one core with at least 60%, preferably at least 75%, of the total light power propagating in the optical waveguide.

BRIEF DESCRIPTION OF THE SEVERAL VIEWS OF THE DRAWINGS

Exemplary embodiments of invention will be explained in more detail below with reference to the figures, which show the following.

DESCRIPTION OF SPECIFIC EMBODIMENTS OF THE INVENTION

Figure 1:
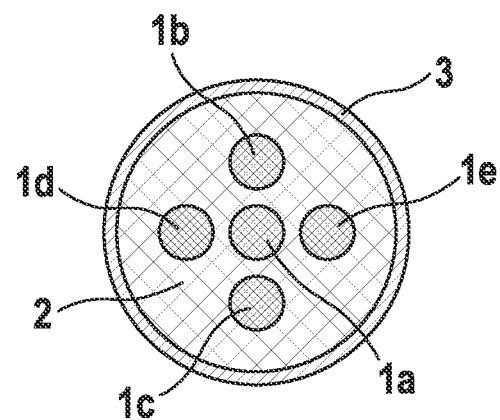
FIG. 1: a) cross-section of an optical waveguide according to the invention with five cores in a cross-shaped arrangement,
b) power distribution of the light propagating in the optical waveguide as a function of the propagation distance.
Figure 1:
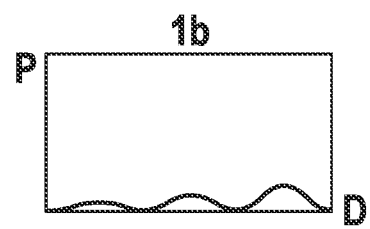
Figure 1:
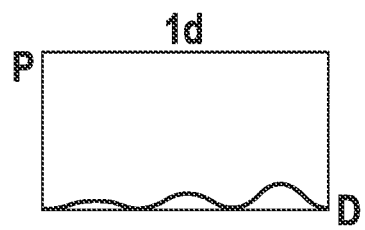
Figure 1:
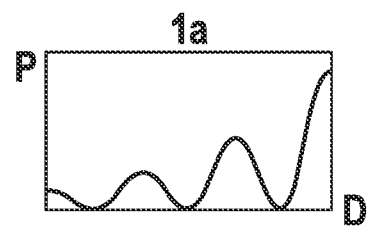
Figure 1:
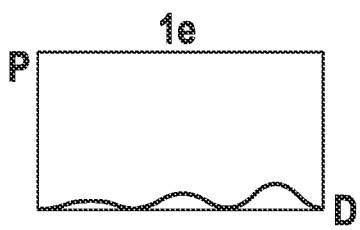
Figure 1:
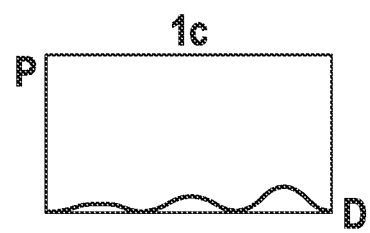

FIG. 1a shows an optical waveguide according to the invention in a cross-sectional illustration. The optical waveguide has five light-guiding cores 1a, 1b, 1c, 1d, 1e each extending continuously along the longitudinal extension of the optical waveguide (i.e. perpendicular to the plane of the drawing) from one end of the optical waveguide to the other, parallel to one another and spaced apart from one another, and a first cladding 2 enclosing the cores 1a-1e jointly. The cores 1b-1e are arranged in a cross shape around the central core 1a. The optical waveguide has a lower refractive index in the region forming the first cladding 2 than in the regions forming the cores 1a-1e. Furthermore, a second cladding 3 is provided, which encloses the first cladding 2 serving as a pump cladding, the optical waveguide having a lower refractive index in the region 3 forming the second cladding than in the region of the first cladding 2. The matrix material of the optical waveguide configured as an optical fiber can be e.g. quartz glass.

According to the invention, light at a working wavelength is coupled into only one of the identically configured cores 1a-1e, and specifically into the central core 1a. Depending on the configuration of the cores 1a-1e (according to size, spacing and guiding properties) and the length of the optical waveguide, the propagation modes of the light initially coupled into the core 1a couple back and forth one or more times between the central core 1a and the surrounding cores 1b-1e, so that the light in the optical waveguide is guided in separate channels 1a-1e as sub-beams over long distances. The desired recombining of the sub-beams in the one core 1a at the end of the optical waveguide is achieved by selecting the appropriate length of the optical waveguide. This condition is met after periodic propagation intervals based on the Talbot effect.

This periodic behavior is illustrated in FIG. 1b. The five diagrams are labelled with the reference signs 1a-1e of the five cores of the arrangement of FIG. 1a, and show the light power P of the light propagating in the respective cores 1a-1e as a function of the propagation distance D. In the exemplary embodiment, the optical waveguide acts as an optical amplifier, such that the maximum power increases over the propagation distance D. The power P starts with a non-zero value only in the core 1a, into which the light is coupled (from the left in the diagrams). The intensity P then oscillates in the five cores 1a-1e as a function of the propagation distance, and specifically with an opposite phase in cores 1b-1e to core 1a, which shows that the light transfers back and forth between the channels 1a-1e during the propagation, i.e. is split and recombined multiple times. The length of the optical waveguide is selected such that the light power P is at its maximum in the core 1a and at its minimum in the other cores 1b-1e at the output of the optical waveguide (on the right in the diagrams). Accordingly, the light leaves the optical waveguide from the central core 1a with the majority of the power (more than 75%).

Figure 2:
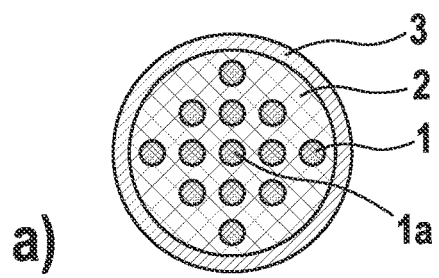
FIG. 2: cross-sectional illustrations of various embodiments of the optical waveguide with different arrangements of the cores.
Figure 2:
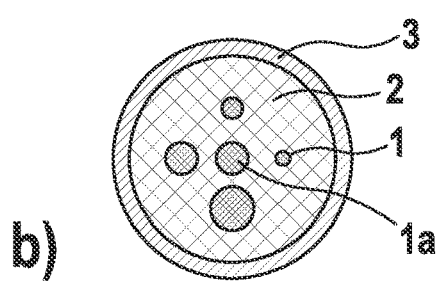
Figure 2:
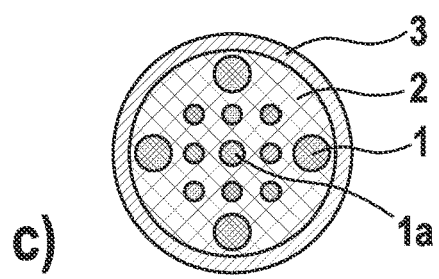
Figure 2:
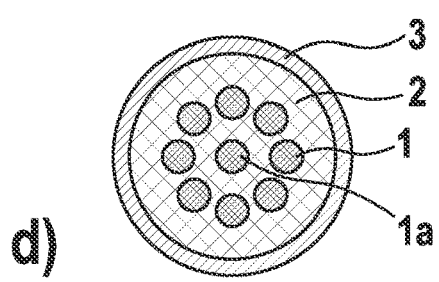
Figure 2:
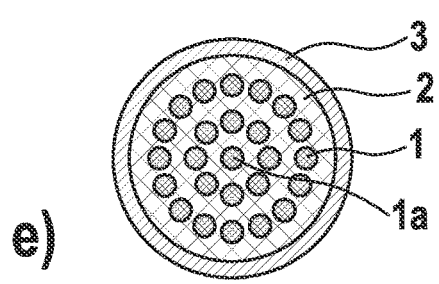

FIG. 2 shows various possible arrangements of the cores in the optical waveguide according to the invention. In FIG. 2a, the number of cores 1 is greater than in FIG. 1. However, the cross shape is maintained. In FIG. 2b, the cores 1 have different diameters. In FIG. 2c, the cross shape according to FIG. 2a is again selected, the cores 1 having different diameters in a symmetrical arrangement. In FIG. 2d, the central core 1a is surrounded by further cores in a ring shape, and in FIG. 2e in two concentric rings with different radii.

Figure 3:
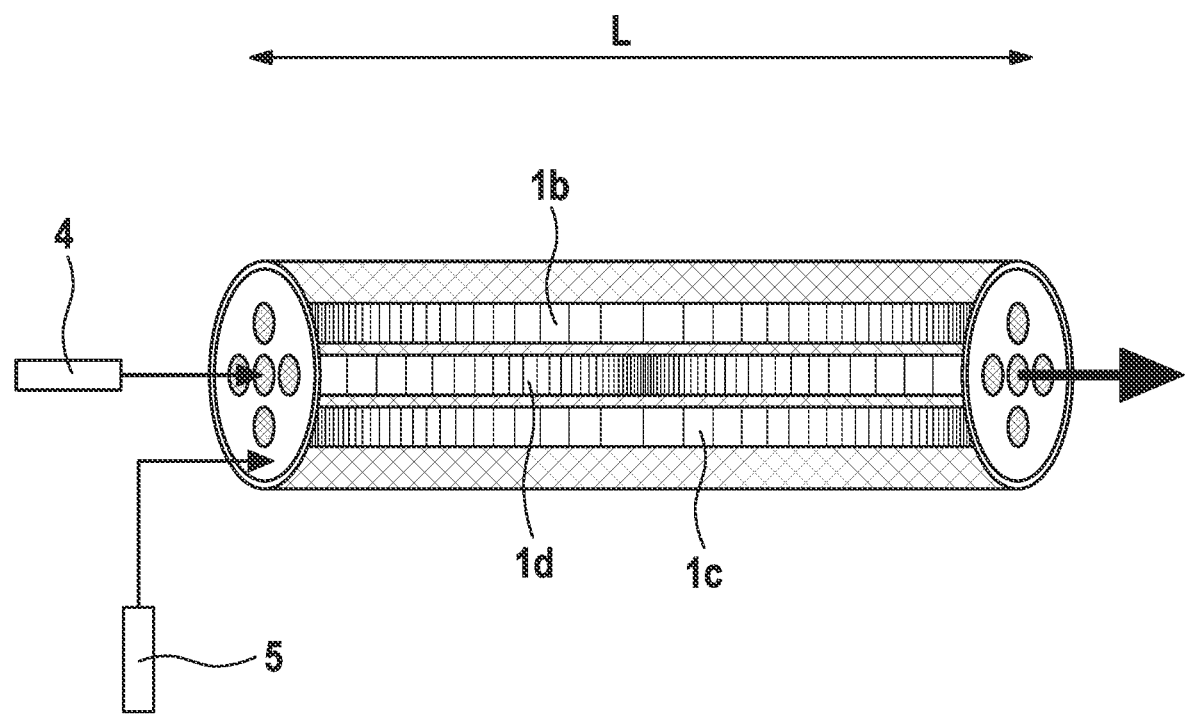
FIG. 3: schematic diagram of a MOPA laser system with the optical waveguide according to the invention as an optical amplifier.

In FIG. 3, the optical waveguide is shown schematically in a cutaway side view, integrated into a laser system. The radiation from a laser light source 4 (e.g. a conventional pulsed fiber laser) is coupled into the central core 1a. The cladding 2 of the optical waveguide is coupled to a pump light source 5 (e.g. a conventional diode laser). The cores 1a-1e are doped with rare earth ions. A core-pumped operation, in which the pump light is coupled into at least some of the cores (1a-1e), is also possible. In the optical waveguide, the power, which comes from the left in the drawing, is distributed between the central core 1a and the other cores 1b-1e, as indicated in FIG. 3 by the different shading along the longitudinal extension of the optical waveguide. The length L of the optical waveguide is selected such that, from the middle of the optical waveguide to the output end on the right, utilizing the Talbot effect, the light power couples back into the central core 1a where the amplified light leaves the optical waveguide. During the propagation of the light through the optical waveguide, therefore, all the light power is distributed over the cores 1a-1e such that nonlinear effects are avoided and, because the thermal load is distributed over all the cores 1a-1e, mode instability is avoided. The optical waveguide is therefore suitable for high-power and ultra-high-power applications. The optical waveguide according to the invention can be used like a single-core optical waveguide with a larger core diameter. There is no need for complex optical arrangements for splitting and combining beams, or control arrangements for stabilizing the phases of the sub-beams.

The invention claimed is:

1. An optical waveguide with:
   two or more light-guiding cores extending continuously along the longitudinal extension of the optical waveguide, parallel to one another and spaced apart from one another, from one end of the optical waveguide to the other, and
   with a first cladding enclosing the cores,
   wherein the cores are arranged relative to one another and are spaced apart from one another in such a way that the propagation modes of the light propagating in the optical waveguide at a working wavelength couple to one another, the length of the optical waveguide being selected such that the light coupled into a single one of the cores at one end of the optical waveguide first spreads to the other cores during propagation through the optical waveguide and, after passing through the optical waveguide, leaves the optical waveguide again at the other end from a single core with at least 60% of the total light power propagating in the optical waveguide;
   wherein at least one of the cores is at least one doped core doped with rare earth ions;
   wherein at least one of the other cores is at least one not doped core not doped with rare earth ions;
   wherein an intensity of the light power propagating in the optical waveguide oscillates in the at least one doped core and in the at least one not doped core over a propagation distance while the light transfers back and forth between the cores,
   wherein a length of the optical waveguide is set such that at least a majority of the light power propagating in the optical waveguide leaves the optical waveguide via the at least one not doped core.

2. The optical waveguide according to claim 1, wherein the optical waveguide has a lower refractive index in the region forming the first cladding than in the regions forming the cores.

3. The optical waveguide according to claim 2, wherein the regions forming the cores of the optical waveguide have refractive indices that differ from one another.

4. The optical waveguide according to claim 1, wherein a refractive index in the region forming at least one of the cores varies along the longitudinal extension of the optical waveguide as a function of the propagation distance.

5. The optical waveguide according to claim 1, further comprising a second cladding, which, as viewed in the cross-section of the optical waveguide, encloses the first cladding, wherein the optical waveguide has a lower refractive index in the region forming the second cladding than in the region of the first cladding.

6. The optical waveguide of claim 1, wherein the length of the optical waveguide being selected such that, utilizing the Talbot effect, after the light has passed through the optical waveguide, it leaves the optical waveguide again at the other end from the single core with at least 75%.

7. The optical waveguide according to claim 1, wherein all except one of the cores are doped with rare earth ions.

8. The optical waveguide according to claim 1, comprising by a central core, arranged centrally as viewed in the cross-section of the optical waveguide, which is surrounded by at least four further cores in a cross-shaped arrangement.

9. The optical waveguide according to claim 1, comprising a central core, arranged centrally as viewed in the cross-section of the optical waveguide, which is surrounded by further cores in a concentric, annular arrangement relative to the central core.

10. The optical waveguide according to claim 1, wherein the cores have identical or different diameters and/or identical or different refractive index profiles.

11. A laser system with a laser light source and an optical amplifier coupled thereto, wherein the optical amplifier is formed by an optical waveguide according to claim 1, wherein the optical waveguide is optically coupled to a pump light source.

12. A method for guiding light in an optical waveguide having two or more light-guiding cores extending continuously along the longitudinal extension of the optical waveguide, parallel to one another and spaced apart from one another, from one end of the optical waveguide to the other, and having a first cladding enclosing the cores, wherein the light is coupled into a single core at one end of the optical waveguide, the cores being arranged relative to one another and spaced apart from one another in such a way that the propagation modes of the light propagating in the optical waveguide at a working wavelength couple to one another, and the light initially spreads from the one core into the other cores, the length of the optical waveguide being selected such that, utilizing the Talbot effect, after the light has passed through the optical waveguide, it leaves the optical waveguide again at the other end from a single core with at least 60% of the total light power propagating in the optical waveguide;

wherein at least one of the cores is at least one doped core doped with rare earth ions;

wherein at least one of the other cores is at least one not doped core not doped with rare earth ions;

wherein an intensity of the light power propagating in the optical waveguide oscillates in the at least one doped core and in the at least one not doped core over a propagation distance while the light transfers back and forth between the cores, wherein a length of the optical waveguide is set such that at least a majority of the light power propagating in the optical waveguide leaves the optical waveguide via the at least one not doped core.

13. The method of claim 12, wherein the length of the optical waveguide being selected such that, utilizing the Talbot effect, after the light has passed through the optical waveguide, it leaves the optical waveguide again at the other end from the single core with at least 75%.

* * * * *